United States Patent
Yoo et al.

(10) Patent No.: US 10,930,268 B2
(45) Date of Patent: Feb. 23, 2021

(54) SPEECH RECOGNITION METHOD AND APPARATUS

(71) Applicant: Samsung Electronics Co., Ltd., Suwon-si (KR)

(72) Inventors: Sang Hyun Yoo, Seoul (KR); Minyoung Mun, Seoul (KR); Inchul Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 16/244,397

(22) Filed: Jan. 10, 2019

(65) Prior Publication Data

US 2019/0371301 A1 Dec. 5, 2019

(30) Foreign Application Priority Data

May 31, 2018 (KR) .................. 10-2018-0062483

(51) Int. Cl.
| | | |
|---|---|---|
| *G10L 15/00* | (2013.01) | |
| *G10L 17/00* | (2013.01) | |
| *G10L 25/00* | (2013.01) | |
| *G10L 15/16* | (2006.01) | |
| *G10L 15/187* | (2013.01) | |
| *G06K 9/62* | (2006.01) | |
| *G06N 3/08* | (2006.01) | |
| *G06N 3/04* | (2006.01) | |

(52) U.S. Cl.
CPC .......... *G10L 15/16* (2013.01); *G06K 9/6267* (2013.01); *G06N 3/0472* (2013.01); *G06N 3/084* (2013.01); *G10L 15/187* (2013.01)

(58) Field of Classification Search
CPC .. G06K 9/6267; G06N 3/0445; G06N 3/0454; G06N 3/0472; G06N 3/08; G06N 3/084; G06N 7/005; G10L 15/16; G10L 15/187; G10L 25/30; G10L 25/51
USPC ........................................................ 704/232
See application file for complete search history.

(56) References Cited

U.S. PATENT DOCUMENTS

| | | | |
|---|---|---|---|
| 7,548,651 B2 | 6/2009 | Shozakai et al. | |
| 9,275,635 B1 * | 3/2016 | Beaufays | ................ G10L 15/32 |
| 9,280,969 B2 | 3/2016 | Li et al. | |
| 9,760,559 B2 * | 9/2017 | Dolfing | ................ G06F 40/284 |
| 9,842,101 B2 * | 12/2017 | Wang | .................... G06F 40/274 |
| 9,858,919 B2 | 1/2018 | Saon | |
| 10,347,241 B1 * | 7/2019 | Meng | ..................... G10L 15/16 |
| 10,529,319 B2 | 1/2020 | Song et al. | |
| 2006/0041428 A1 * | 2/2006 | Fritsch | ................ G10L 15/1815 |
| | | | 704/257 |

(Continued)

FOREIGN PATENT DOCUMENTS

| | | |
|---|---|---|
| JP | 2005-62866 A | 3/2005 |
| JP | 5914119 B2 | 5/2016 |

(Continued)

*Primary Examiner* — Khai N. Nguyen
(74) *Attorney, Agent, or Firm* — NSIP Law

(57) ABSTRACT

Disclosed is a speech recognition method and apparatus, wherein the apparatus acquires first outputs from sub-models in a recognition model based on a speech signal, acquires a second output including values corresponding to the sub-models from a classification model based on the speech signal, and recognizes the speech signal based on the first outputs and the second output.

20 Claims, 12 Drawing Sheets

(56) References Cited

U.S. PATENT DOCUMENTS

| | | | | |
|---|---|---|---|---|
| 2010/0162400 A1* | 6/2010 | Feeney | ............... | G06F 21/563 |
| | | | | 726/24 |
| 2010/0299135 A1* | 11/2010 | Fritsch | ................... | G06F 40/30 |
| | | | | 704/9 |
| 2011/0055256 A1* | 3/2011 | Phillips | ................... | G10L 15/30 |
| | | | | 707/769 |
| 2011/0137831 A1* | 6/2011 | Ide | ...................... | G08G 1/0112 |
| | | | | 706/12 |
| 2011/0257974 A1* | 10/2011 | Kristjansson | ....... | G10L 21/0208 |
| | | | | 704/246 |
| 2015/0006168 A1 | 1/2015 | Mysore et al. | | |
| 2016/0358600 A1* | 12/2016 | Nallasamy | ............. | G10L 15/16 |
| 2017/0084268 A1 | 3/2017 | Yoo et al. | | |
| 2018/0068653 A1 | 3/2018 | Trawick et al. | | |
| 2019/0147854 A1* | 5/2019 | Li | ......................... | G10L 15/065 |
| | | | | 704/256 |
| 2019/0371301 A1* | 12/2019 | Yoo | ......................... | G10L 15/16 |
| 2020/0126534 A1* | 4/2020 | Yoo | ......................... | G06N 3/08 |

FOREIGN PATENT DOCUMENTS

| | | | |
|---|---|---|---|
| JP | 2016-177214 A | 10/2016 | |
| KR | 10-2014-0066640 A | 6/2014 | |
| KR | 10-1444411 B1 | 10/2014 | |
| KR | 10-2016-0059265 A | 5/2016 | |
| KR | 10-2017-0030923 A | 3/2017 | |
| KR | 10-1740636 B1 | 5/2017 | |
| KR | 10-2017-0119152 A | 10/2017 | |

\* cited by examiner

SPEECH RECOGNITION METHOD AND APPARATUS

CROSS-REFERENCE TO RELATED APPLICATIONS

This application claims the benefit under 35 USC § 119(a) of Korean Patent Application No. 10-2018-0062483 filed on May 31, 2018 in the Korean Intellectual Property Office, the entire disclosure of which is incorporated herein by reference for all purposes.

BACKGROUND

1. Field

The following description relates to a speech recognition method and apparatus.

2. Description of Related Art

A speech recognition apparatus may include an acoustic model, a language model, and a decoder. The acoustic model may provide information on an association between a speech signal and pronunciation, and the language model may provide information on a frequency of use of a sentence.

Even in the same language, the pronunciation may be different for each user, or various pronunciations may be present in addition to a standard pronunciation. Performance may degrade when the various pronunciations are recognized using a single model. Various schemes have been proposed to solve the performance degradation occurring due to the various pronunciations. One of the schemes is a scheme of recognizing a pronunciation by categorizing similar pronunciations and generating a model for each category. However, the performance for scheme using a model for each group may deteriorate when recognizing a pronunciation that does not belong to the corresponding group. Accordingly, there is a desire for technology for recognizing various types of pronunciations with increased efficiency and accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a speech recognition method including acquiring first outputs from sub-models in a recognition model based on a speech signal, acquiring a second output including values corresponding to the sub-models from a classification model based on the speech signal, and recognizing the speech signal based on the first outputs and the second output.

The sub-models may include models for estimating pronunciations classified into groups based on a similarity of pronunciation for each of the groups.

The groups may be classified based on any one or any combination of dialects, regions, and races in a language.

The sub-models may be models for estimating pronunciations for each of the users.

The recognition model may include a neural network for estimating a pronunciation of the speech signal, and the sub-models may each include learning hidden unit contributions (LHUCs) or layers trained independently of one another in the neural network.

The sub-models may share at least one layer in the neural network.

A feature acquired from a layer shared by the sub-models may be applied to the trained layers.

The acquiring of the second output may include acquiring a feature from a layer in the recognition model, and acquiring the second output by applying the acquired feature to the classification model.

The acquiring of the second output may include generating a feature suitable for an input layer of the classification model based on the speech signal, and acquiring the second output by applying the generated feature to the classification model.

The recognizing of the speech signal may include generating a third output by obtaining a weighted sum between the first outputs and the values included in the second output, and estimating a pronunciation of the speech signal based on the third output.

The values included in the second output may be probabilities that the speech signal belongs to each of the sub-models.

The nodes in an output layer of the classification model may correspond to the sub-models.

The acquiring of the second output may include applying a bias to the values included in the second output based on a context associated with the speech signal, and the context may include any one or any combination of a location and a language of a keyboard of a device to which the speech signal is applied.

An acoustic model including the recognition model and the classification model may be connected to a language model on an end-to-end basis, and the recognizing of the speech signal may include recognizing a word or a sentence of the speech signal based on the first outputs and the second output.

The values corresponding to the sub-models may include weights corresponding to each of the sub-models.

The recognition model may be trained to recognize a language of the users, and the sub-models are trained to recognize languages corresponding to groups of the users.

In another general aspect, there is provided a speech recognition method including generating an input feature of a recognition model including sub-models based on a speech signal, acquiring probabilities that the speech signal belongs to the sub-models from a classification model based on the speech signal, generating a second input feature by applying the probabilities to the input feature, and recognizing the speech signal by applying the second input feature to the recognition model.

An input layer of the recognition model may include nodes corresponding to the probabilities.

In another general aspect, there is provided a speech recognition apparatus including a processor configured to acquire first outputs from sub-models in a recognition model based on a speech signal, to acquire a second output including values corresponding to the sub-models from a classification model based on the speech signal, and to recognize the speech signal based on the first outputs and the second output.

In another general aspect, there is provided a training apparatus for speech recognition, the apparatus including a processor configured to train a recognition model including sub-models based on first training speech signals, to train the sub-models based on second training speech signals corresponding to the sub-models, and to train a classification model that generates outputs corresponding to the sub-models based on the second training speech signals.

In another general aspect, there is provided a speech recognition method including generating a first input feature for the recognition model including sub-models based on a speech signal, acquiring probabilities of the speech signal belonging to each of the sub-models from the classification model based on the speech signal, generating a second input feature for the recognition model based on applying the probabilities to the first input feature, and recognizing the speech signal based on an output generated, in response to the second input feature being applied to the classification model.

Other features and aspects will be apparent from the following detailed description, the drawings, and the claims.

Figure 1:
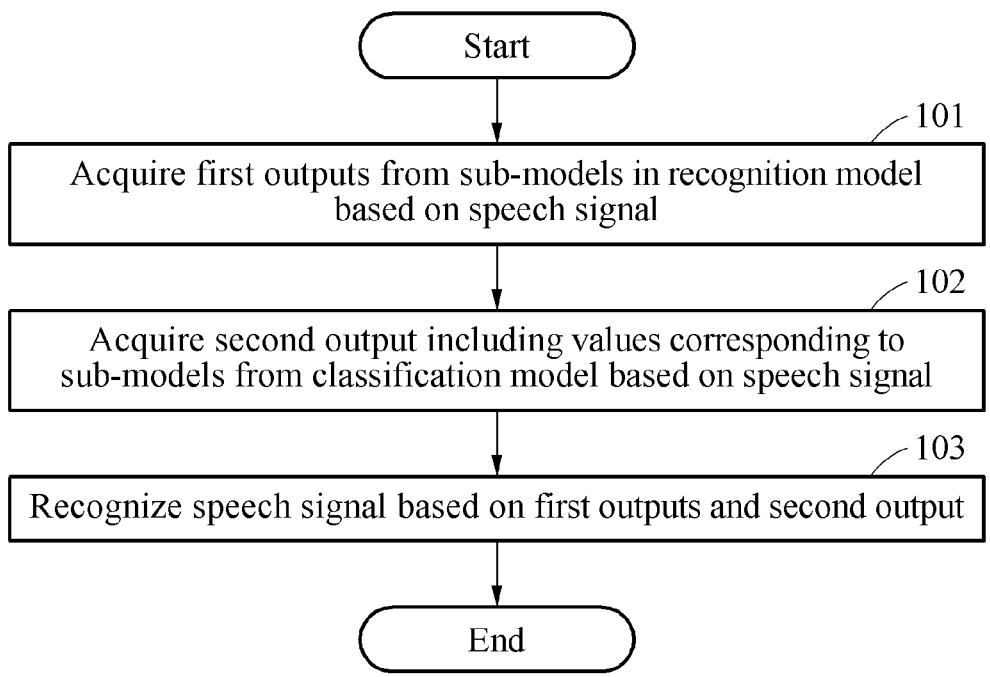
FIG. 1 illustrates an example of a speech recognition method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise.

The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 illustrates an example of a speech recognition method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

Referring to FIG. 1, in operation 101, a speech recognition apparatus acquires first outputs respectively from sub-models in a recognition model based on a speech signal. The speech recognition apparatus refers to an apparatus to process information required to perform speech recognition and may be embodied by, for example, a hardware module, or a combination of a software module and a hardware module. The speech recognition apparatus may generate or process operations, calculations, instructions, and the like that are related to speech recognition.

The speech recognition apparatus may be embedded in or configured to interact with various devices, such as, for example, a mobile phone, an intelligent agent, a cellular phone, a smartphone, a portable personal computer (PC), a laptop, a notebook, a subnotebook, a netbook, or an ultra-mobile PC (UMPC), a phablet, a tablet PC, a smart pad, a personal digital assistant (PDA), a laptop computer, a desktop computer, a digital camera, a portable game console, an MP3 player, a portable/personal multimedia player (PMP), a handheld e-book, a handheld game console, an e-book, a set-top box, a speech recognition speaker, a TV, a smart television (TV), a speech recognition TV, a DVD player, a Blue-ray player, a setup box, a personal navigation device or portable navigation device (PND), a global positioning system (GPS) navigation device, robot cleaners, a security system, a home appliance, a smart appliance, an intelligent vehicle, a smart building system, a smart home system, a smart office system, or a smart electronic security system, or various Internet of Things (IoT) devices that are controlled through a network. Also, the speech recognition apparatus may be included in or configured to interact with a wearable device, which is any device that is mounted on the body of the user, such as, for example, a ring, a watch, a pair of glasses, glasses-type device, a bracelet, an ankle bracelet, a belt, a necklace, an earring, a headband, a helmet, or a device embedded in clothing, or an eye glass display (EGD).

In an example, the speech recognition apparatus may be embedded in or configured to interact with an intelligent vehicle or a kiosk. For example, the speech recognition apparatus may be applied to user verification or authentication used in, for example, a smartphone, a mobile device, a smart home system. The examples may also be applied to payment services to be provided through user verification or authentication. Further, the examples may also be applied to an intelligent vehicle system that automatically starts a vehicle through user verification or authentication, or a kiosk that permits entry after verification or authentication.

The speech recognition apparatus may load information associated with an acoustic model from a database provided in advance. The database may be embodied as a memory included in the speech recognition apparatus or an external device, such as, for example, a server connected to the speech recognition apparatus through a network, or wired or wireless communications.

The speech recognition apparatus acquires a speech signal. The speech signal is a signal including speech information. The speech recognition apparatus determines a pronunciation of the speech signal using the acoustic model. The speech recognition apparatus recognizes a word or a sentence corresponding to the speech signal using a model having a structure in which the acoustic model and a language model are connected on an end-to-end basis. A unit for recognizing the speech signal may be implemented in various forms, such as, for example, an utterance unit, a window unit, and a frame unit. One frame may include speech information corresponding to 10 milliseconds (msec).

The speech signal uses an acoustic model including a recognition model and a classification model to recognize the speech signal. Hereinafter, the speech recognition method of FIG. 1 will be further described, and an acoustic model will be described with reference to FIG. 2.

Figure 2:
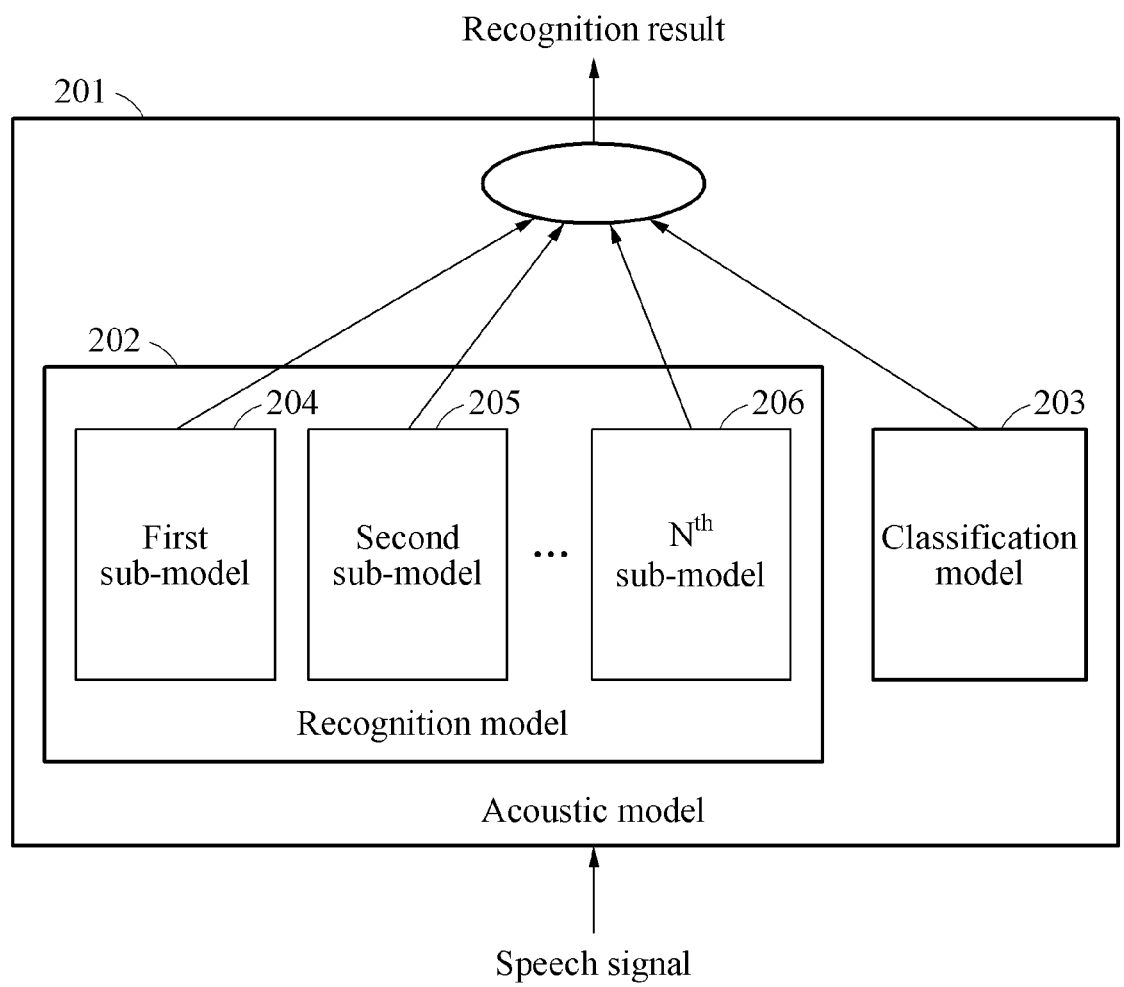
FIG. 2 illustrates an example of an acoustic model.

FIG. 2 illustrates an example of an acoustic model.

Referring to FIG. 2, a speech recognition apparatus generates a recognition result from an acoustic model 201 based on a speech signal. The acoustic model 201 includes a recognition model 202 and a classification model 203. In an example, the recognition model 202 includes sub-models, for example, a first sub-model 204, a second sub-model 205, and an $N^{th}$ sub-model 206.

In an example, the recognition model 202 and the classification model 203 are implemented by a neural network. The recognition model 202 and the classification model 203 are implemented as a neural network by, for example, various structures such as a deep neural network (DNN), a recurrent neural network (RNN), a recurrent DNN (RDNN), a Gaussian mixture model (GMM), or an n-layer neural network, and a bidirectional long short-term memory (BL-STM). The DNN or n-layer neural network may correspond to a convolutional neural network (CNN), a recurrent neural network (RNN), a deep belief network, a fully connected network, a bi-directional neural network, or a restricted Boltzman machine, or may include different or overlapping neural network portions respectively with full, convolutional, recurrent, and/or bi-directional connections. A machine learning structure as which the recognition model 202 and the classification model 203 is implemented is not limited thereto, and the recognition model 202 and the classification model 203 may be implemented in a form of combination of at least one or more of the structures of the GMM, DNN, and the BLSTM.

The neural network includes a plurality of layers. For example, the neural network includes an input layer, at least one hidden layer, and an output layer. The input layer receives input data and transmits the input data to the hidden layer, and the output layer generates output data based on signals received from nodes of the hidden layer. In an example, the neural network has a structure having a plurality of layers including an input, feature maps, and an output. In the neural network, a convolution operation is performed on the input source sentence with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network.

In a typical neural network structure, an input and an output may be independent of each other. The RNN has a neural network structure in which previous outputs affect a calculation result of a new output. The neural network includes an input layer, at least one hidden layer, and an output layer. At least one node of the input layer corresponds to an input feature applied to the neural network. At least one node of the output layer corresponds to an output feature applied to the neural network. Nodes of layers in the neural network may nonlinearly affect one another. Also, parameters of the neural network such as values output from each of the nodes and a relationship between the nodes may be optimized through training.

In an example, the recognition model 202 estimates information associated with pronunciation information of the speech signal. In an example, the classification model 203 estimates information associated with classification result corresponding to the sub-models 204, 205, and 206. The speech recognition apparatus applies the speech signal or a feature acquired from the speech signal to the recognition model 202.

The sub-models 204, 205, and 206 are models for estimating pronunciations classified into groups based on a pronunciational similarity, for each of the groups. When pronunciations corresponding to a target for recognition are classified into groups of similar pronunciations based on a scheme, the sub-models 204, 205, and 206 may be recognition models corresponding to the groups.

The groups corresponding to the sub-models 204, 205, and 206 are classified based on any one or any combination of dialects, regions, and races in a single language. For example, the recognition model 202 is trained to recognize English. Also, the sub-models 204, 205, and 206 of the recognition model 202 are additionally trained to recognize, for example, Indian English, Chinese English, Korean English, and European English which may be differently classified based on races or regions. As such, a basis model of the recognition model 202 recognizes English, and the sub-models 204, 205, and 206 of the recognition model 202 recognize different-types of Englishes corresponding to the classified groups.

The sub-models 204, 205, and 206 are models for estimating pronunciations of users for each of the users. For example, the recognition model 202 is trained to recognize a language of the users. Also, the sub-models 204, 205, and 206 of the recognition model 202 are trained to recognize specific languages corresponding to the users for each of the users. The sub-models 204, 205, and 206 of the recognition model 202 may be models specialized for individuals.

As described above, the speech recognition apparatus acquires first outputs generated in the sub-models 204, 205, and 206 of the recognition model 202. The first outputs include values generated in hidden layers or output layers included in the sub-models 204, 205, and 206. For example, based on the speech signal, the speech recognition apparatus acquires a first output corresponding to native English from the first sub-model 204, acquires a second output corresponding to Korean English from the second sub-model 205, and acquires a first output corresponding to Indian English from the $N^{th}$ sub-model 206.

Referring back to FIG. 1, in operation 102, the speech recognition apparatus acquires a second output including values corresponding to the sub-models 204, 205, and 206 from the classification model 203 based on the speech signal. The speech recognition apparatus applies the speech signal or a feature acquired from the speech signal to the classification model 203. Also, the classification model 203 generates the second output. To generate a recognition result of the acoustic model 201 from the speech signal, the second output is applied to the first outputs acquired from the sub-models 204, 205, and 206.

The second output includes the values corresponding to the sub-models 204, 205, and 206. Nodes included in an output layer of the classification model 203 may correspond to the sub-models 204, 205, and 206.

The second output includes information associated with a degree to which each of the first outputs generated from the sub-models 204, 205, and 206 contributes to a recognition result. The values included in the second output may be probabilities of the speech signal belonging to each of the sub-models 204, 205, and 206 or weights corresponding to the sub-models 204, 205, and 206.

For example, when the second output generated in the classification model 203 includes values including probability information, the speech recognition apparatus acquires a probability of the speech signal belonging to the first sub-model 204 corresponding to plane English, a probability of the speech signal belonging to the second sub-model 205 corresponding to Korean English, and a probability of the speech signal belonging to the third sub-model 206 corresponding to Indian English from the second output.

Referring back to FIG. 1, in operation 103, the speech recognition apparatus recognizes the speech signal based on the first outputs acquired from the sub-models 204, 205, and 206 and the second output acquired from the classification model 203. The speech recognition apparatus performs an operation of values included in the first outputs and the second output. In an example, to blend the first outputs acquired from the sub-models 204, 205, and 206, the speech recognition apparatus applies the second output to the first outputs.

In an example, the speech recognition apparatus generates a third output by obtaining a weighted sum between the first outputs and the values included in the second output. The speech recognition apparatus estimates a pronunciation of the speech signal based on the third output generated based on the weighted sum. The recognition result includes probability information associated with a phoneme or the pronunciation corresponding to the speech signal. Embodiments in which the speech recognition apparatus obtains a recognition result based on the values acquired from the sub-models 204, 205, and 206 and the value acquired from the classification model 203 are not limited to the foregoing example and thus, various schemes may be employed to combine results of models that are trained differently.

In an example, the speech recognition apparatus uses the sub-models 204, 205, and 206 and the classification model 203 to increase a recognition performance for a speech signal that does not belong to a particular category or belongs to various categories. For example, when a user speaks in a language between Chinese English and Korean English, the speech recognition apparatus provides a processing performance robust to a speech signal of the user. The speech recognition apparatus generates the sub-models 204, 205, and 206 for users to provide speech recognition optimized for individuals. The speech recognition apparatus may also increase a processing performance for a speech signal having a different pronunciation in a portion of the entire sentence.

As described above, the acoustic model 201 is connected to the language model on an end-to-end basis. In this example, the speech recognition apparatus recognizes a word or a sentence corresponding to the speech signal based on the first outputs and the second output. In an end-to-end structure, the recognition result may include probability information associated with the word or the sentence corresponding to the speech signal. A structure of a sub-model will be described with reference to FIGS. 3A and 3B.

Figure 3A:
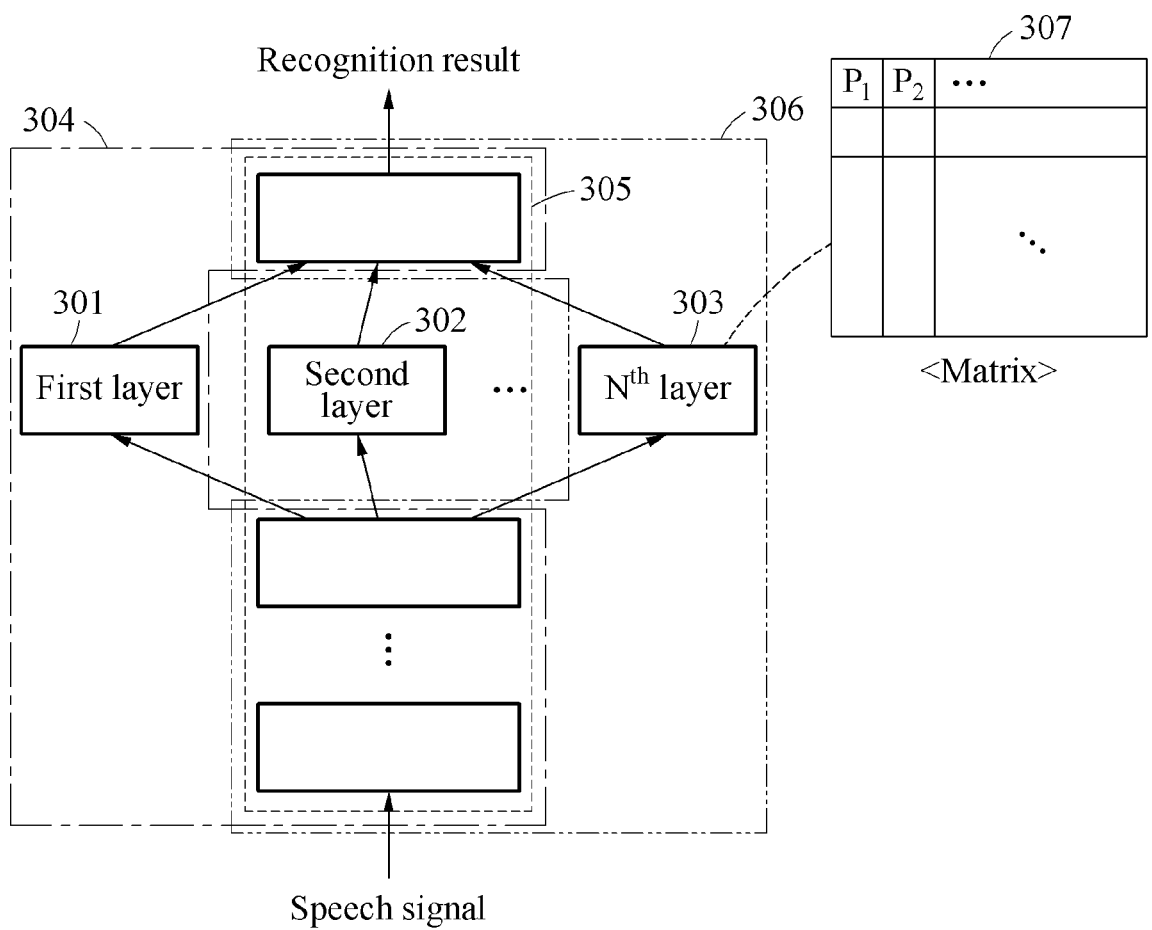
FIG. 3A illustrates an example of a sub-model.

FIG. 3A illustrates an example of a sub-model.

Referring to FIG. 3A, a recognition model in an acoustic model includes sub-models, for example, a first sub-model 304, a second sub-model 305, and an $N^{th}$ sub-model 306. The recognition model includes a neural network for estimating a pronunciation of a speech signal. The sub-models 304, 305, and 306 include layers, for example, a first layer 301, a second layer 302, and an $N^{th}$ layer 303 and share at least one layer in the neural network of the recognition model. The first sub-model 304 includes the first layer 301. The second sub-model 305 includes the second layer 302. The $N^{th}$ sub-model 306 includes the $N^{th}$ layer 303.

The recognition model is trained based on a base language. For example, the recognition model is trained to estimate a pronunciation from a speech signal in English. Each of the sub-models 304, 305, and 306 are additionally trained for a group of pronunciations. The first sub-model 304 is trained to estimate a pronunciation from a speech signal in Native English, the second sub-model 305 is trained to estimate a pronunciation from a speech signal in Korean English, and the $N^{th}$ sub-model 306 is trained to estimate a pronunciation from a speech signal in Indian English.

When the training is performed on the sub-models 304, 305, and 306, parts trained in the recognition model are the layers 301, 302, and 303 corresponding to the sub-models 304, 305, and 306. For example, when the first sub-model 304 is trained after the training of the recognition model, the first layer 301 specialized for the first sub-model 304 may be trained. Likewise, the second layer 302 and the $N^{th}$ layer 303 may be specialized for the second sub-model 305 and the $N^{th}$ sub-model 306 to be trained.

The sub-models 304, 305, and 306 include the layers 301, 302, and 303 that are trained independently of one another. The sub-models 304, 305, and 306 share at least one layer that is a basis of the recognition model in the neural network of the recognition model. A feature acquired from the layer shared by the sub-models 304, 305, and 306 is applied to the trained layers 301, 302, and 303 of the sub-models 304, 305, and 306.

In an example, the layers 301, 302, and 303 specialized for the sub-models 304, 305, and 306 are expressed in a form of matrix. For example, the $N^{th}$ layer 303 is expressed as a matrix 307 including information of trained parameters. In this example, a training of the $N^{th}$ sub-model 306 may be performed by optimizing parameters of the $N^{th}$ layer 303 in the recognition model.

Each of the trained sub-models 304, 305, and 306 generates an output corresponding to the group of the pronunciations based on the speech signal. A number and types of layers specialized for each sub-model may vary in accordance with, for example, system efficiency and design intention.

Figure 3B:
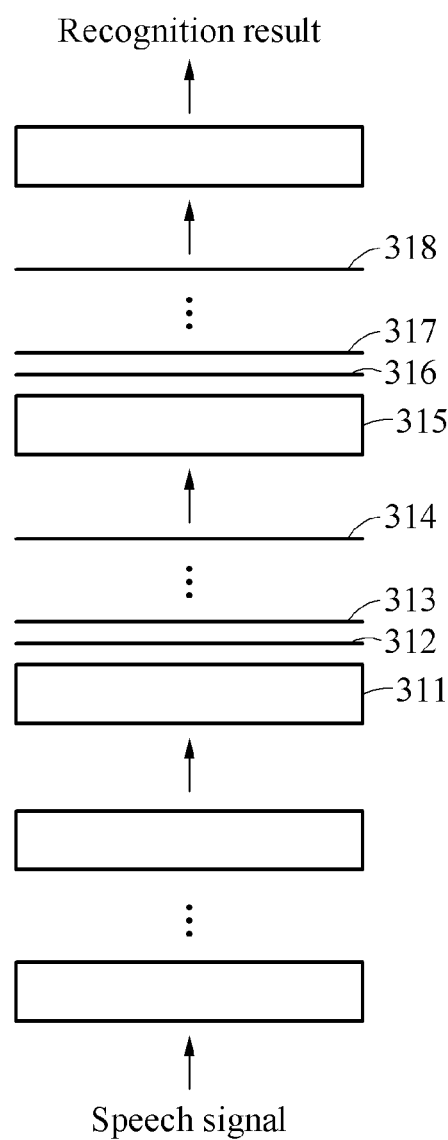
FIG. 3B illustrates an example of a sub-model.

FIG. 3B illustrates an example of a sub-model.

Referring to FIG. 3B, sub-models in a recognition model share at least one layer in a neural network of the recognition model. Also, the sub-models include learning hidden unit contributions (LHUCs) 312, 313, 314, 316, 317, and 318 trained independently of one another. An LHUC may be represented by a vector. A first sub-model includes the LHUCs 312 and 316, a second sub-model includes the LHUCs 313 and 317, a third sub-model includes the LHUCs 314 and 318. As described above, the recognition model is trained based on a base language and each of the sub-models is additionally trained for each group of pronunciations.

The LHUCs 312, 313, and 314 include vectors adjusting output values of a layer 311 shared by the sub-models in the recognition model. The LHUCs 316, 317, and 318 include vectors adjusting output values of a layer 315 shared by the sub-models in the recognition model. When the training is performed on the sub-models, parts trained in the recognition model are the LHUCs 312, 313, 314, 316, 317, and 318 corresponding to the sub-models.

For example, when a first sub-model is trained after the training of the recognition model, the LHUCs 312 and 316 specialized for the first sub-model may be trained. Likewise, the LHUCs 313 and 317 specialized for a second sub-model and the LHUCs 314 and 318 specialized for a third sub-model may be trained. The first sub-model includes the LHUCs 312 and 316 are trained independently of each other, the second sub-model includes the LHUCs 313 and 317 are trained independently of each other, and the third sub-model includes the LHUCs 314 and 318 are trained independently of each other. As described above, the sub-models share at least one layer that is a basis of the recognition model in the neural network of the recognition model.

The LHUCs 312, 313, 314, 316, 317, and 318 are expressed in forms of vectors specialized for the sub-models. For example, the LHUCs 312 and 316 are expressed as vectors including information of trained parameters. In this example, a training of the first sub-model may be performed by optimizing parameters of the LHUCs 312 and 316 in the recognition model. A number and types of LHUCs specialized for each sub-model may vary in accordance with, for example, system efficiency and design intention.

Figure 4:
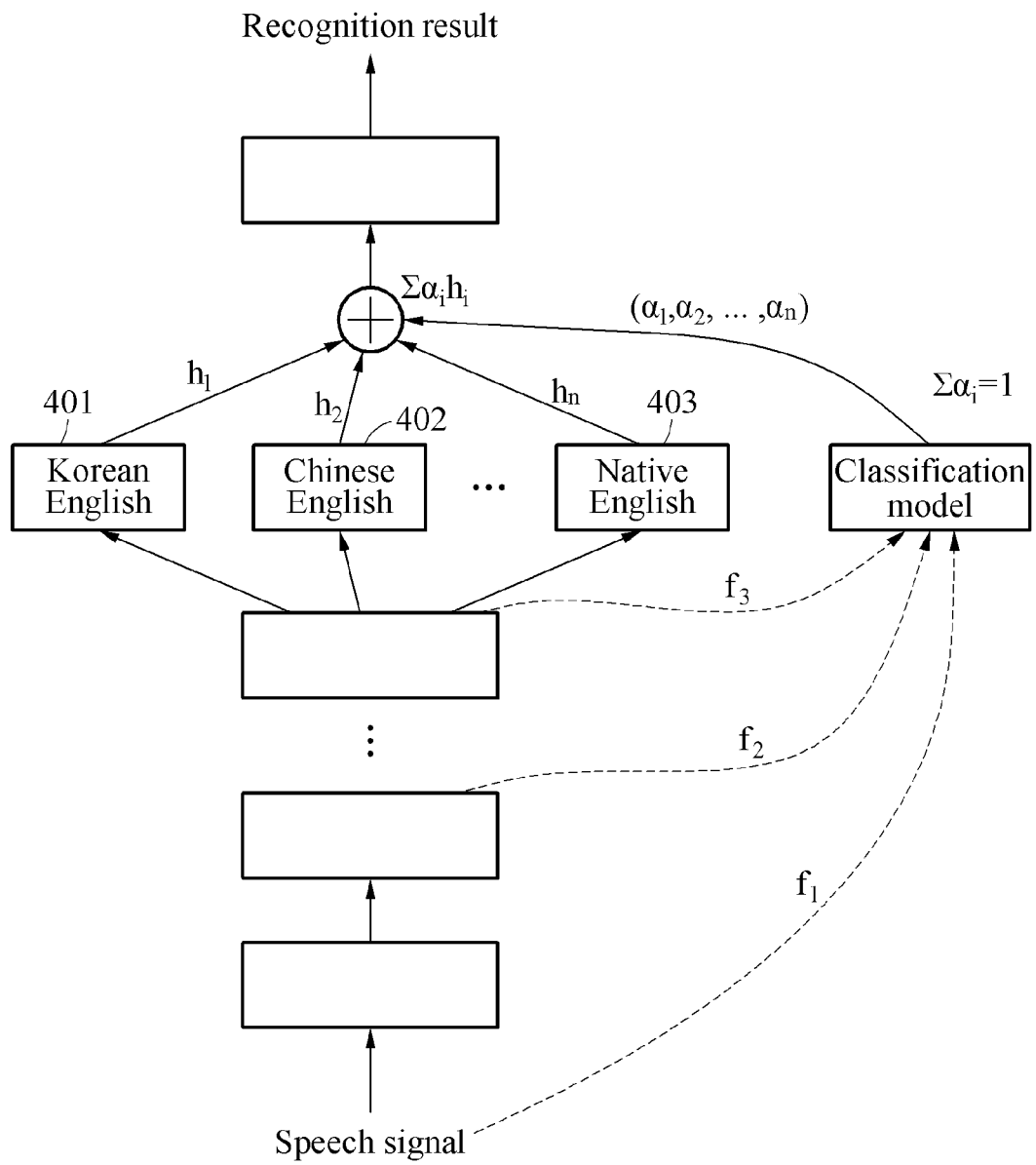
FIG. 4 illustrates an example of an input applied to a classification model.

FIG. 4 illustrates an example of an input applied to a classification model.

Referring to FIG. 4, a speech recognition apparatus generates a recognition result based on a weighted sum between probabilities $\alpha_1, \alpha_2, \ldots, \alpha_n$ of groups acquired from a classification model in the recognition model and values $h_1, h_2, \ldots, h_n$ acquired from hidden layers 401, 402, and 403 corresponding to sub-models. The probabilities $\alpha_1, \alpha_2, \ldots, \alpha_n$ may be values respectively corresponding to the values $h_1, h_2, \ldots, h_n$ and a sum of the respective values may be 1.

The speech recognition apparatus applies a speech signal to the classification model. The classification model generates an output, for example, the probabilities $\alpha_1, \alpha_2, \ldots, \alpha_n$ from the speech signal. In this example, an input layer of the classification and nodes in the input layer may correspond to the speech signal.

The speech recognition apparatus generates a feature $f_1$ suitable for the input layer based on the speech signal. The speech recognition apparatus applies the feature $f_1$ to the classification model and acquires the generated output from the classification model. In this example, the input layer of the classification model and the nodes in the input layer may correspond to the feature $f_1$.

The speech recognition apparatus acquires a feature from at least one layer in the recognition model. Referring to FIG. 4, the speech recognition apparatus acquires a feature $f_2$ or $f_3$, applies an acquired feature to the classification model, and acquires the generated output from the classification model. In this example, the input layer of the classification model and the nodes in the input layer correspond to the feature $f_2$ or $f_3$. The speech recognition apparatus generates a feature suitable for the input layer of the classification model based on the features $f_2$ and $f_3$ generated in layers of the recognition model, and applies the generated feature to the classification model. A number and types of inputs applied to the classification model may vary based on a feature extracted from the recognition model, and are not limited to the foregoing example.

Figure 5:
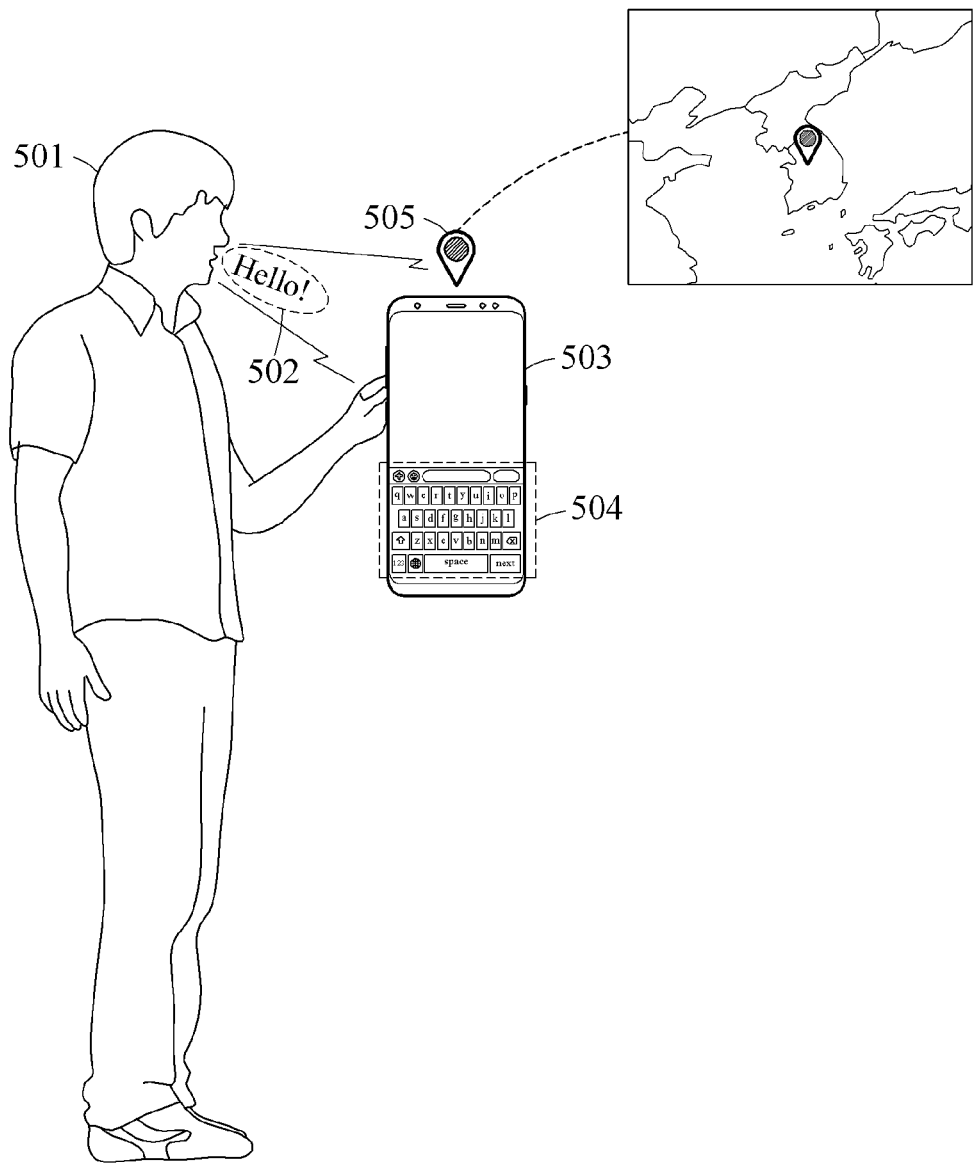
FIG. 5 illustrates an example of an input applied to a classification model.

FIG. 5 illustrates an example of an input applied to a classification model.

Referring to FIG. 5, the speech recognition apparatus processes an output acquired from a classification model based on a context associated with a speech signal 502. The context is information affecting a correlation between the speech signal 502 of a user 501 and at least one sub-model in the recognition model and includes, for example, history information such as a use history of a user terminal 503 or the user 501.

The speech recognition apparatus applies at least one bias to values included in the output acquired from the classification model based on the context associated with the speech signal 502. The context includes at least one of a keyboard language type 504 and a location 505 of the user terminal 503 to which the speech signal 502 is applied. For example, when the keyboard language type 504 of the user terminal 503 is Korean, or when the location 505 of the user terminal 503 is Korea, the speech recognition apparatus applies a bias to the output of the classification model by increasing a value corresponding to Korean English among values included in the values included in the output acquired from the classification model. A method of processing or changing the output of the classification is not limited to the foregoing example and may be variously applied based on information associated with the user 501 or the user terminal 503.

As the foregoing, examples of applying the output generated in the classification model to the outputs of the sub-models in the recognition model are described with reference to FIGS. 1 through 5. An example of generating an input feature applied to a recognition model based on an output of a classification model will be described with reference to FIG. 6.

Figure 6:
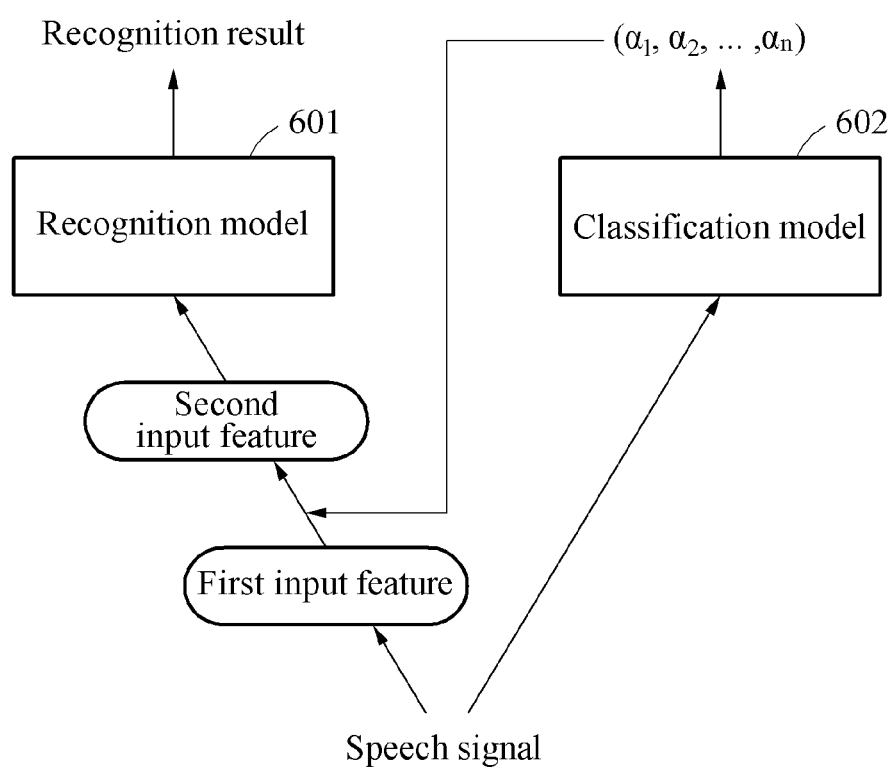
FIG. 6 illustrates an example of a speech recognition method.

FIG. 6 illustrates an example of a speech recognition method.

Referring to FIG. 6, the speech recognition apparatus generates a recognition result from a speech signal using a recognition model 601 and a classification model 602. The speech recognition apparatus generates a first input feature of the recognition model 601 including sub-models based on the speech signal. The speech recognition apparatus acquires probabilities $\alpha_1, \alpha_2, \ldots, \alpha_n$ that the speech signal belongs to the sub-models from the classification model 602 based on the speech signal.

The speech recognition apparatus generates a second input feature by applying the probabilities $\alpha_1, \alpha_2, \ldots, \alpha_n$ to the first input feature. The speech recognition apparatus applies the second input feature to the recognition model 601 to recognize the speech signal.

An input layer of the recognition model 601 includes nodes corresponding to the probabilities $\alpha_1, \alpha_2, \ldots, \alpha_n$. In this example, the speech recognition apparatus applies the input feature generated from the speech signal to a portion of the nodes in the input layer of the recognition model 601, and applies the probabilities $\alpha_1, \alpha_2, \ldots, \alpha_n$ acquired from the classification model 602 to a remaining portion of the nodes in the input layer.

The recognition model 601 is trained in advance based on a base language, and the sub-models in the recognition model 601 is trained for each group. The classification model 602 is trained to generate an input feature to be applied to the recognition model 601. The classification model 602 is trained such that a recognition result generated based on a training speech signal is close to a training recognition result that is a ground truth. For example, training probabilities corresponding to a training speech signal are acquired from the classification model 602, a training input feature reflecting the training probabilities are applied to the recognition model 601, and at least one of the recognition model 601 and the classification model 602 is optimized such that a recognition result generated in the recognition model 601 is close to a training recognition result. In training, backpropagation may be performed to optimize parameters of a neural network of the recognition model 601 and the classification model 602. However, a training scheme is not limited to the backpropagation, and various schemes may be employed. Hereinafter, the training method for speech recognition of FIGS. 1 through 5 will be further described with reference to FIGS. 7 through 10. At least a portion of the following examples may also be applicable to the speech recognition method described with reference to FIG. 6.

Figure 7:
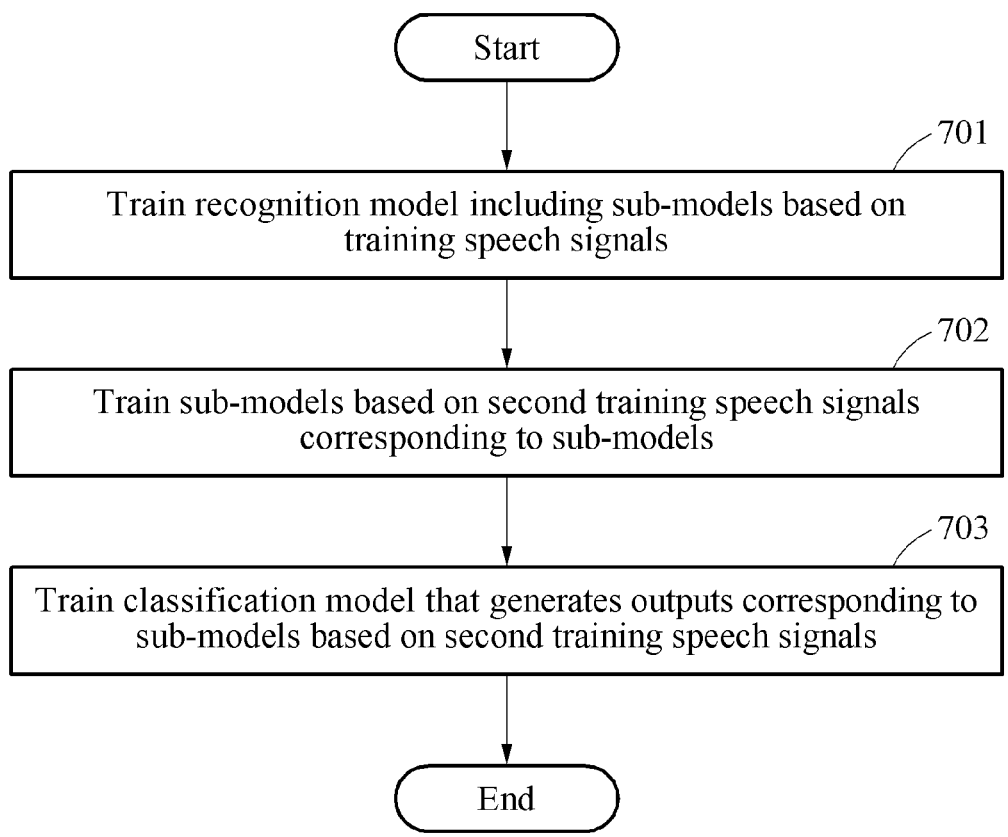
FIG. 7 illustrates an example of a training method for speech recognition.

FIG. 7 illustrates an example of a training method for speech recognition. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 701, a training apparatus for speech recognition trains a recognition model including sub-models based on training speech signals. The training apparatus may be an apparatus for performing a training for speech recognition and implemented by, for example, a hardware module, or a combination of a hardware module and a software module. The training apparatus may generate or process operations, calculations, instructions, and the like that are related to the training. The training apparatus may train a base model for estimating a pronunciation of a speech signal. For example, when a base language is English, the training apparatus may train a recognition model to recognize English.

In operation 702, the training apparatus trains the sub-models based on second training speech signals corresponding to the sub-models. The training apparatus collects the second training speech signals classified for each of the sub-models and trains each of the sub-models based on the collected second training speech signals.

For example, the training apparatus trains sub-models corresponding to native English based on second training speech signals corresponding to native English, trains sub-models corresponding to Korean English based on second training speech signals corresponding to Korean English, and trains sub-models corresponding to Indian English based on second training speech signals corresponding to Indian English. In this example, a training speech signal is a training sample employed to train a base model in a recognition model, and a second training speech signal is a training sample employed to train a sub-model in the recognition model.

In an example, operations 701 and 702 may be performed simultaneously. The training apparatus trains a base model and a sub-model for each language based on training speech signals. For example, the training apparatus trains a base model and a sub-model corresponding to Indian English based on training speech signals corresponding to Indian English. The training apparatus trains the base model and a sub-model corresponding to Chinese English based on training speech signals corresponding to Chinese English.

When training the recognition model and the sub-model, a backpropagation scheme for optimizing parameters in a neural network to reduce a value of a loss function between a recognition result generated in the training and a ground truth may be employed. Also, various training schemes may be applied thereto. A training of the sub-models will be further described with reference to FIG. 8.

Figure 8:
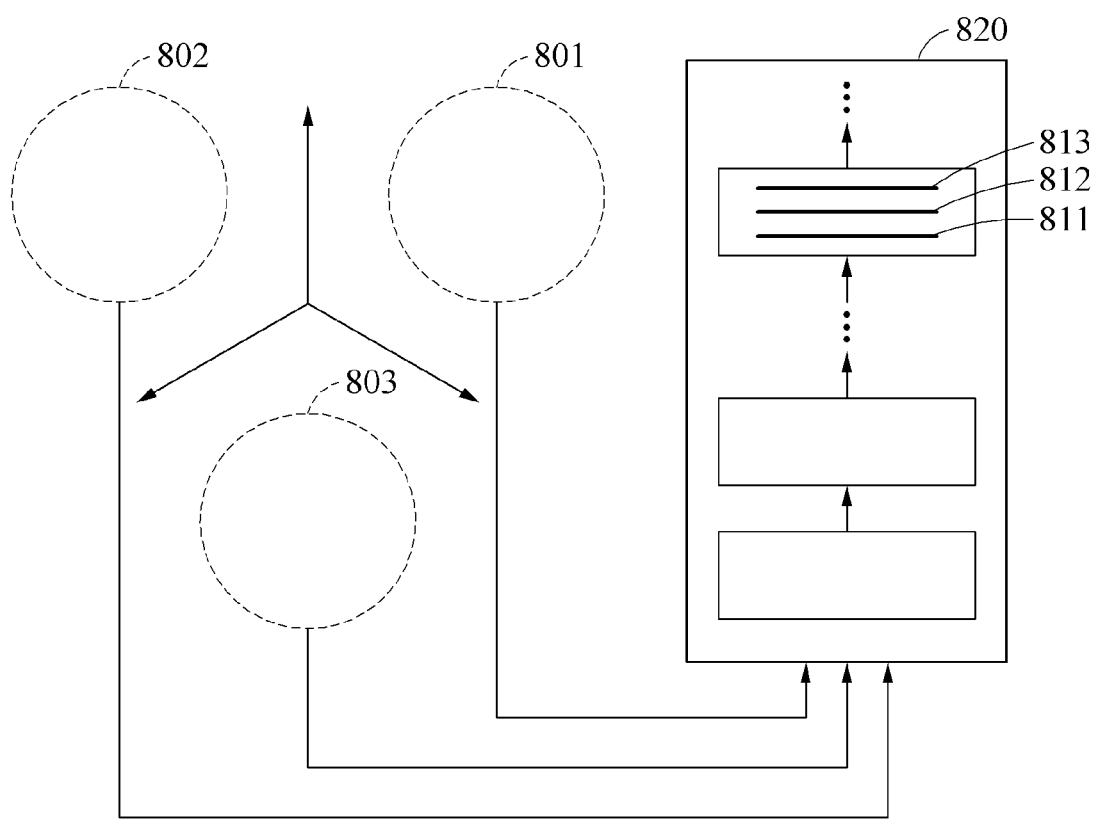
FIG. 8 illustrates an example of an operation of training a sub-model.

FIG. 8 illustrates an example of an operation of training a sub-model.

Referring to FIG. 8, second training speech signals 801, 802, and 803 for training sub-models in a recognition model 820 are clustered based on a pronunciational similarity and classified for each of the sub-models. Various references for classifying a speech signal may be employed for clustering.

A training apparatus applies the second training speech signals 801 corresponding to a first group to the recognition model 820 to train an LHUC 811 or at least one layer of a sub-model corresponding to the first group. The training apparatus applies the second training speech signals 802 corresponding to a second group to the recognition model 820 to train an LHUC 812 or at least one layer of a sub-model corresponding to the second group. Likewise, the training apparatus applies the second training speech signals 803 corresponding to a third group to the recognition model 820 to train an LHUC 813 or at least one layer of a sub-model corresponding to the third group.

When the sub-model corresponding to the first group is trained, parameters of the LHUC 811 or the corresponding layer are optimized. Likewise, parameters of the LHUC 812 or the corresponding layer are optimized when the sub-model corresponding to the second group is trained and parameters of the LHUC 813 or the corresponding layer are optimized when the sub-model corresponding to the third group is trained. The training of the sub-models may be additionally performed after a training is performed on a pronunciation of a base language in the recognition model 820.

Referring back to FIG. 7, in operation 703, the training apparatus trains a classification model that generates outputs corresponding to the sub-models based on the second training speech signals corresponding to the sub-models. The training apparatus uses ground truths corresponding to the second training speech signals to train the classification model. Hereinafter, a hard training method and a soft training method for training a classification model will be described with reference to FIGS. 9 and 10.

Figure 9:
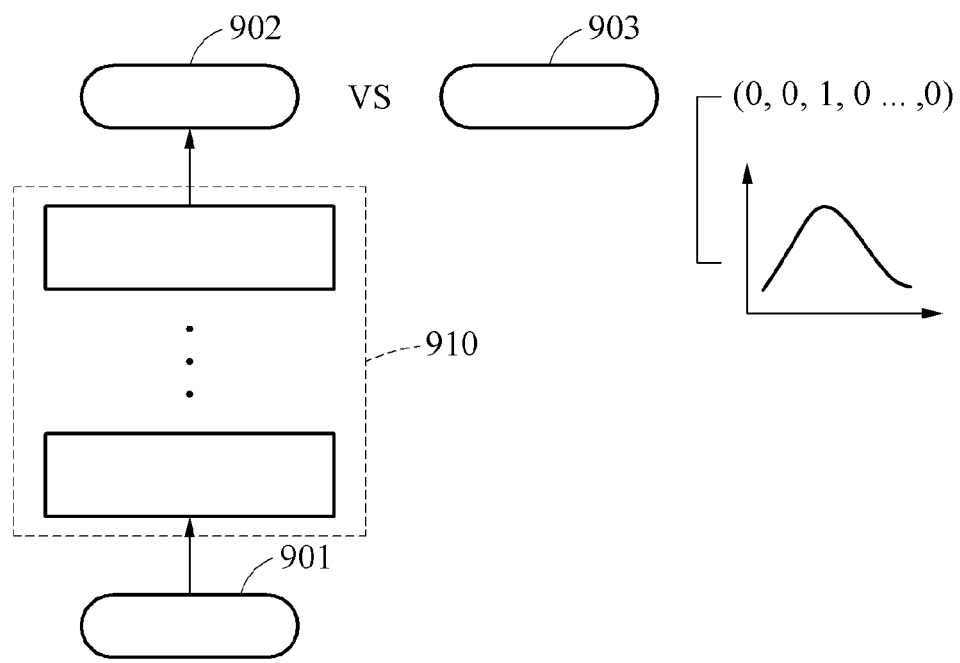
FIG. 9 illustrates an example of an operation of training a classification model.

FIG. 9 illustrates an example of an operation of training a classification model.

Referring to FIG. 9, a training apparatus trains a classification model 910 based on second training speech signals corresponding to sub-models. The training apparatus acquires a second training speech signal 901 and a corresponding second training output 903. In this example, the second training output 903 includes information on a ground truth corresponding to the second training speech signal 901 and information on probabilities that the second training speech signal 901 belongs to the sub-models.

The probabilities included in the information of the second training output 903 may be expressed discrete as 0 or 1, or expressed as a normal distribution. For example, when the second training speech signal 901 belongs to a sub-model corresponding to Indian English, the second training output 903 includes information indicating that a probability of the second training speech signal 901 belonging to the sub-model corresponding to Indian English is 1 and remaining probabilities are 0. In consideration of a training performance of the classification model 910, a label smoothing may be performed on second training outputs. The second training outputs express information corresponding to sub-models as, for example, the normal distribution.

The training apparatus acquires an output 902 by applying the second training speech signal 901 to the classification model 910. The training apparatus trains a neural network of the classification model 910 such that the output 902 acquired from the classification model 910 is close to the second training output 903. When the training is completed, parameters of the neural network of the classification model 910 are optimized.

Figure 10:
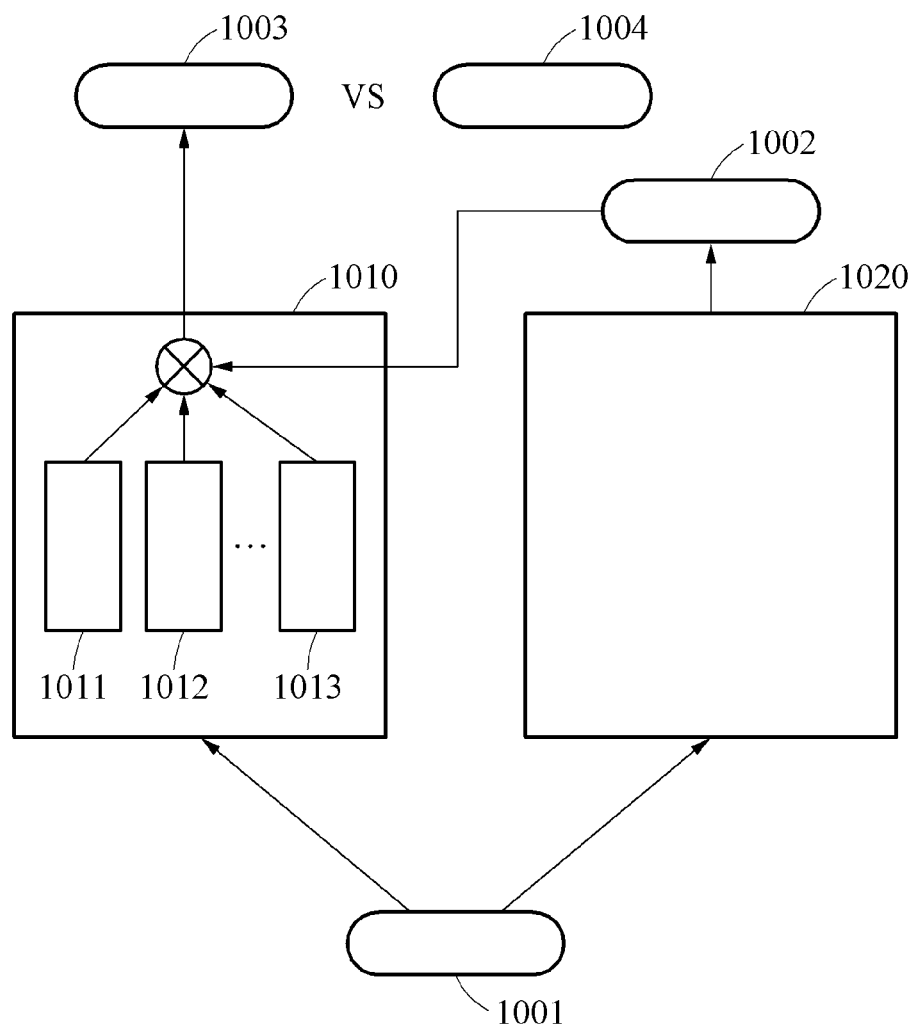
FIG. 10 illustrates an example of an operation of training a classification model.

FIG. 10 illustrates an example of an operation of training a classification model.

Referring to FIG. 10, a training apparatus trains a classification model 1010 based on second training speech signals corresponding to sub-models 1011, 1012, and 1013 in a recognition model 1010. The training apparatus acquires a second training speech signal 1001 and a second training output 1004 corresponding to each other. In this example, the second training output 1004 includes information on a ground truth corresponding to the second training speech signal 1001. In contrast to the example of FIG. 9, the second training output 1004 includes information corresponding to a pronunciation of the second training speech signal 1001.

The training apparatus acquires first outputs from the sub-models 1011, 1012, and 1013 by applying the second training speech signal 1001 or an extracted input feature to the recognition model 1010. The first outputs are generated in output layers or hidden layers of the sub-models 1011, 1012, and 1013.

The training apparatus acquires a second output 1002 by applying the second training speech signal 1001 or the extracted input feature to the classification model 1020. The training apparatus generates a third output 1003 based on the first outputs acquired from the sub-models 1011, 1012, and 1013, and the second output 1002 acquired from the classification model 1020. As described above, a weighted sum between the first outputs and the second output 1002 is calculated.

The training apparatus trains a neural network of the classification model 1020 such that the third output 1003 is close to the second training output 1004. When the training is completed, parameters of the neural network of the classification model 1020 are optimized. The soft training method of FIG. 10 may be performed on the classification model 1020 after the training of the recognition model 1010, and may also be performed in connection with the training of the recognition model 1010.

In comparison to the hard training method of FIG. 9, the soft training method of FIG. 10 is different in that a recognition result of the recognition model 1010 is applied. The training apparatus may train the classification model 1020 by combining the hard training method of FIG. 9 and the soft training method of FIG. 10 at a ratio. For example, the training apparatus may perform the hard training method on the classification model 1020 and perform a fine-tuning on parameters of the classification model 1020 using the soft training method.

Figure 11:
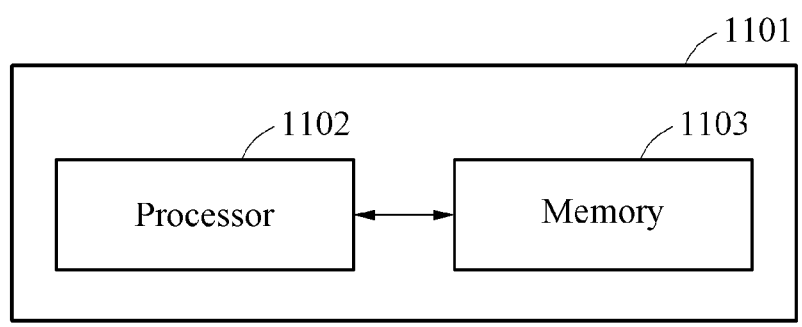
FIG. 11 illustrates an example of an apparatus.

FIG. 11 illustrates an example of an apparatus.

Referring to FIG. 11, an apparatus 1101 includes a processor 1102 and a memory 1103. The apparatus 1101 may be the speech recognition apparatus or the training apparatus described herein. The processor 1102 may include at least one apparatus described with reference to FIGS. 1 through 10, and perform one or more operations, steps, or processes, or all the operations, steps, or processes described herein with reference to FIGS. 1 through 10. Further details of the processor 1102 are provided below. The memory 1103 may store the speech recognition method described herein or information associated with the speech recognition method, store the training method described herein or information associated with the training method, or store a program that implements the speech recognition method or the training method. The memory 1103 may be a volatile memory or a nonvolatile memory. Further details of the memory 1103 are provided below.

The processor 1102 may execute the program and control the apparatus 1101. A code of the program executed by the processor 1102 may be stored in the memory 1103. The apparatus 1101 may be connected to an external device, for example, a PC and a network, through an input and output device (not shown), and exchange data with the external device.

FIG. 12 is a diagram illustrating an example of an electronic device 1200 configured to implement a neural network. Referring to FIG. 12, the electronic device 1200 includes a sensor 1210, a processor 1220, a local memory 1225 (not shown), a memory 1230, a display 1250, and a user interface (UI) 1260. The sensor 1210, the processor 1220, the memory 1230, the display 1250, and the UI 1260 communicate with each other via a bus 1240. The electronic device 1200 may correspond to one or more of the devices identified above, such as, for example, smart phone, smart pad, speech recognition speaker, speech recognition TV, robot cleaners, kiosk, eye glass display, smart appliance, smart home device, intelligent vehicle, or device 1101 of FIG. 11, and may implement any one or more or all of the above processes or methods. As a non-limiting example, the processor 1220 may correspond to processor 1102 of FIG. 11, and/or the memory 1230 may correspond to the memory 1103 of FIG. 11. Further details of the processor 1220 are provided below. The memory 1230 may store the speech recognition method described herein or information associated with the speech recognition method, store the training method described herein or information associated with the training method, or store a program that implements the speech recognition method or the training method. Further details of the memory 1230 are provided below.

When the speech recognition model is a neural network, the memory 1230 may store a database from which kernel elements, feature maps, weight elements, voice elements, and/or image elements may be loaded from and into the local buffers/memories of the processor 1220. In an example, the local buffers/memories may be memories of the processor 1220 or buffers/memories directly connected to the processor 1220, e.g., configured for rapidly transferring data to/from the processor 1220 and the local buffers/memories, noting that alternatives are also available. The local buffers/memories may further be allocated to temporarily store convolutional output results of a particular layer of the neural network, or all layers of the neural network, the ultimate output results of which may be stored in the memory 1230 and/or respectively used for inputs to a next layer. In an example, except for purposes of an input to a next layer, the convolutional results of each layer may be discarded and only final layer(s) output results of the neural network stored to the memory 1230 or used for another process, such as in cooperation with an unlocking and corresponding display operation of a mobile phone as the electronic device 1200. As also noted, the processor 1220 may represent one or more processors that are configured as any one or any combination of the above neural network processing apparatuses or translation apparatuses, as non-limiting examples.

The sensor 1210 includes, for example, a microphone and/or an image sensor or camera to sense audio data and video data to collects sounds produced by a person speaking near the electronic device 1200. An output of the sensor 1210 is transferred to the processor 1220 or the memory 1230, and output of the sensor 1210 may also be transferred directly to, or operate as, an input layer of a neural network discussed herein.

The processor 1220 may be configured to perform one or more or all processes described with reference to FIGS. 1-11. For example, the processor 1220 may recognize speech signal and generate text data corresponding to the speech signal, the processor 1220 may recognize, reject, or verify the input data based on the neural network processing operations described above with respect to FIGS. 1-11, which efficiently processes a convolution operation in a neural network to identify the language group of the user based on classification model. In another example, the processor 1220 efficiently processes a convolution operation in a neural network to estimate information associated with pronunciation information of the speech signal through loss back-propagation learning, which may also be considered acceleration processing. The result of any of the recognition operations may be output through the display 1250. In addition, user adjustments or selective operations of the neural network processing operations discussed herein may be provided by UI 1260, which may include a touch screen or other input/output device/system. As noted above and described below, the processor 1220 may be a graphics processor unit (GPU), reconfigurable processor, or have any other type of multi- or single-processor configuration.

In addition to operations of one or more of the neural network processing apparatuses and/or operations described in FIGS. 1-11 as noted above, the memory 1230 may further store instructions which, when executed by processor 1220, cause the processor 1220 to perform additional operations, functions, and controls of the electronic device 1200, such as a user interface of the electronic system. The electronic device 1200 may be connected to an external device, for example, a personal computer (PC) or a network, via an input/output device of the electronic system, to exchange data with the external device. The electronic device 1200 may be various devices, some non-limiting examples of which are mentioned above.

The UI 1260 refers to a configuration to receives a speech of a user or an answer text or suggests a recognition result or a guide text to the user. For example, the UI 1260 includes a microphone to receive the speech of the user. In another example, the UI 1260 includes a keyboard, a touch screen or a touch pad to receive the answer text from the user. In another example, UI 1260 includes a display 1250 to suggest the recognition result. In an example, the display is a physical structure that includes one or more hardware components that provide the ability to render a user interface and/or receive user input. In an example, the display 1250 can be embedded in the device 1200. In an example, the display is an external peripheral device that may be attached to and detached from the device 1200. The display may be a single-screen or a multi-screen display.

The apparatus 1101, electronic device 1200, and other apparatuses, units, modules, devices, components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory, such as, a multimedia card, a secure digital (SD) or a extreme digital (XD), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A speech recognition method comprising:
acquiring first outputs from sub-models in a recognition model based on a speech signal;
acquiring, based on the speech signal, a second output comprising respective probabilities that the speech signal belongs to each of the sub-models from a classification model; and recognizing the speech signal based on a weighted sum of the first outputs and the second output, wherein the sub-models comprise models for estimating pronunciations classified into groups based on a similarity of pronunciation for each of the groups, and wherein the classification model is configured to estimate a probability or weight associated with each of the sub-models and nodes in an output layer of the classification model correspond to each of the sub-models.

2. The speech recognition method of claim 1, wherein the groups are classified based on any one or any combination of dialects, regions, and races in a language.

3. The speech recognition method of claim 1, wherein the sub-models are models for estimating pronunciations for each of the users.

4. The speech recognition method of claim 1, wherein the recognition model comprises a neural network for estimating a pronunciation of the speech signal, and the sub-models each include learning hidden unit contributions (LHUCs) or layers trained independently of one another in the neural network.

5. The speech recognition method of claim 4, wherein the sub-models share at least one layer in the neural network.

6. The speech recognition method of claim 5, wherein a feature acquired from a layer shared by the sub-models is applied to the trained layers.

7. The speech recognition method of claim 1, wherein the acquiring of the second output comprises:

acquiring a feature from a layer in the recognition model; and acquiring the second output by applying the acquired feature to the classification model.

8. The speech recognition method of claim 1, wherein the acquiring of the second output comprises:

generating a feature suitable for an input layer of the classification model based on the speech signal; and acquiring the second output by applying the generated feature to the classification model.

9. The speech recognition method of claim 1, wherein the recognizing of the speech signal comprises:

generating a third output based on the weighted sum between the first outputs and the respective probabilities included in the second output; and estimating a pronunciation of the speech signal based on the third output.

10. The speech recognition method of claim 1, wherein the acquiring of the second output comprises:

applying a bias to the probabilities included in the second output based on a context associated with the speech signal, and the context comprises any one or any combination of a location and a language of a keyboard of a device to which the speech signal is applied.

11. The speech recognition method of claim 1, wherein an acoustic model comprising the recognition model and the classification model are connected to a language model on an end-to-end basis, and the recognizing of the speech signal comprises:
recognizing a word or a sentence of the speech signal based on the first outputs and the second output.

12. The speech recognition method of claim 1, wherein the respective probabilities comprise weights corresponding to each of the sub-models.

13. The speech recognition method of claim 1, wherein the recognition model is trained to recognize a language of the users, and the sub-models are trained to recognize languages corresponding to groups of the users.

14. A non-transitory computer-readable storage medium storing instructions that, when executed by a processor, cause the processor to perform the method of claim 1.

15. A speech recognition method comprising:

generating an input feature of a recognition model including sub-models based on a speech signal;

acquiring probabilities that the speech signal belongs to the respective sub-models from a classification model based on the speech signal;

generating a second input feature by applying the probabilities to the input feature; and recognizing the speech signal by applying the second input feature to the recognition model, wherein the sub-models comprise models for estimating pronunciations classified into groups based on a similarity of pronunciation for each of the groups, and wherein the classification model is configured to estimate a probability or weight associated with each of the sub-models and nodes in an output layer of the classification model correspond to each of the sub-models.

16. The speech recognition method of claim 15, wherein an input layer of the recognition model comprises nodes corresponding to the probabilities.

17. A non-transitory computer-readable storage medium storing instructions that, when executed by a processor, cause the processor to perform the method of claim 15.

18. A speech recognition apparatus comprising:

a processor configured to acquire first outputs from sub-models in a recognition model based on a speech signal, to acquire, based on the speech signal, a second output comprising respective probabilities that the speech signal belongs to each of the sub-models from a classification model, and to recognize the speech signal based on a weighted sum of the first outputs and the second output, wherein the sub-models comprise models for estimating pronunciations classified into groups based on a similarity of pronunciation for each of the groups, and wherein the classification model is configured to estimate a probability or weight associated with each of the sub-models and nodes in an output layer of the classification model correspond to each of the sub-models.

19. A training apparatus for speech recognition, the apparatus comprising:

a processor configured to train a recognition model comprising sub-models based on first training speech signals, to train sub-models based on second training speech signals corresponding to the sub-models, and to train a classification model that generates outputs corresponding to the sub-models based on the second training speech signals.

20. A speech recognition method comprising:

generating a first input feature for a recognition model comprising sub-models based on a speech signal;

acquiring respective probabilities of the speech signal belonging to each of the sub-models from a classification model based on the speech signal;

generating a second input feature for the recognition model based on applying the probabilities to the first input feature; and recognizing the speech signal based on an output generated, in response to the second input feature being applied to the classification model, wherein the sub-models comprise models for estimating pronunciations classified into groups based on a similarity of pronunciation for each of the groups, and wherein the classification model is configured to estimate a probability or weight associated with each of the sub-models and nodes in an output layer of the classification model correspond to each of the sub-models.

* * * * *